(12) United States Patent
Boyd et al.

(10) Patent No.: US 7,857,021 B2
(45) Date of Patent: Dec. 28, 2010

(54) SYSTEM FOR POSITIONING A WORKPIECE

(75) Inventors: Murray Boyd, Salmon Arm (CA);
Sandy Webster, Salmon Arm (CA);
Roland Davyduke, Salmon Arm (CA);
Ronald H. Pobuda, Salmon Arm (CA);
Carl Flatman, Salmon Arm (CA); Rory M. Mitchell, Hayden, ID (US)

(73) Assignee: USNR/Kockums Cancar Company, Vancouver, WA (US)

( * ) Notice: Subject to any disclaimer, the term of this patent is extended or adjusted under 35 U.S.C. 154(b) by 1152 days.

(21) Appl. No.: 11/221,928

(22) Filed: Sep. 9, 2005

(65) Prior Publication Data
US 2006/0048853 A1 Mar. 9, 2006

Related U.S. Application Data

(60) Provisional application No. 60/608,101, filed on Sep. 9, 2004.

(51) Int. Cl.
*B23Q 15/00* (2006.01)
(52) U.S. Cl. .................. 144/394; 144/404; 144/3.1
(58) Field of Classification Search ................ 144/382, 144/392, 394, 402, 404, 1.1, 2.1, 3.1, 356
See application file for complete search history.

(56) References Cited

U.S. PATENT DOCUMENTS

| | | | | |
|---|---|---|---|---|
| 3,886,372 | A | | 5/1975 | Sanglert |
| 3,981,393 | A | * | 9/1976 | Landers ...................... 198/379 |
| 4,120,333 | A | | 10/1978 | Hallgren et al. |
| 4,158,778 | A | * | 6/1979 | Gard et al. ............... 250/461.1 |
| 4,413,662 | A | | 11/1983 | Gregoire et al. |
| 4,489,635 | A | * | 12/1984 | Cooper ........................ 83/708 |
| 4,515,196 | A | | 5/1985 | Shields |
| 4,665,786 | A | | 5/1987 | Shields |
| 4,947,909 | A | | 8/1990 | Stroud |
| 5,042,341 | A | | 8/1991 | Greten et al. |
| 5,228,112 | A | | 7/1993 | Lemelson |
| 5,257,101 | A | | 10/1993 | Lee |
| 5,429,161 | A | * | 7/1995 | Allard ...................... 144/248.4 |
| 5,765,617 | A | * | 6/1998 | Mierau et al. ............... 144/387 |
| 5,918,653 | A | | 7/1999 | Knerr |

(Continued)

FOREIGN PATENT DOCUMENTS

AU 2004100409 A4 6/2004

(Continued)

*Primary Examiner*—Shelley Self
(74) *Attorney, Agent, or Firm*—Schwabe, Williamson & Wyatt

(57) ABSTRACT

A system for positioning a workpiece in an optimized position. In one embodiment a marking device places a mark on the workpiece prior to the workpiece passing through a scanner cooperating with an optimizer. The optimizer determines the optimized position of the workpiece. The orientation of the workpiece is identified by a first camera. The mark may be used as a point of reference such that the workpiece may be positioned in the optimized position by rotating the workpiece relative to the orientation of the mark. A turning mechanism rotates the workpiece to position it in the optimized position. A further camera identifies the orientation of the mark while the workpiece is being rotated. A processor compares in real time the orientation of the workpiece with the optimized position to determine if the workpiece is in the optimized position.

25 Claims, 5 Drawing Sheets

U.S. PATENT DOCUMENTS

| | | | |
|---|---|---|---|
| 6,072,890 A * | 6/2000 | Savard et al. | 382/110 |
| 6,757,354 B2 | 6/2004 | Skatter et al. | |
| 6,778,681 B2 | 8/2004 | Garms et al. | |
| 7,171,278 B2 * | 1/2007 | Baker et al. | 700/28 |
| 7,280,687 B2 * | 10/2007 | Ban et al. | 382/154 |

FOREIGN PATENT DOCUMENTS

| | | |
|---|---|---|
| CA | 2480976 A1 | 3/2006 |
| CA | 2518681 A1 | 3/2006 |
| EP | 1 215 004 B1 | 9/2005 |

* cited by examiner

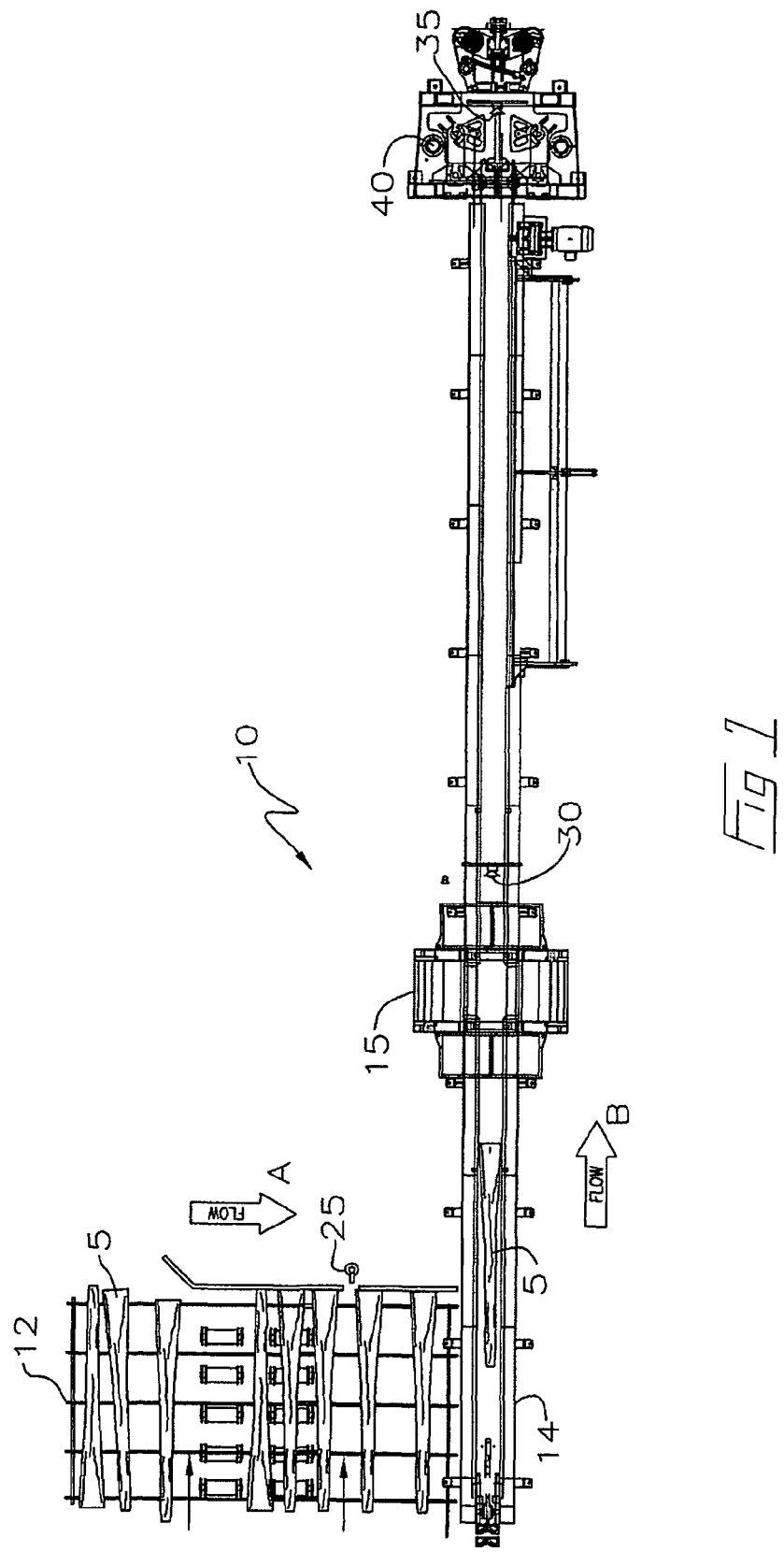

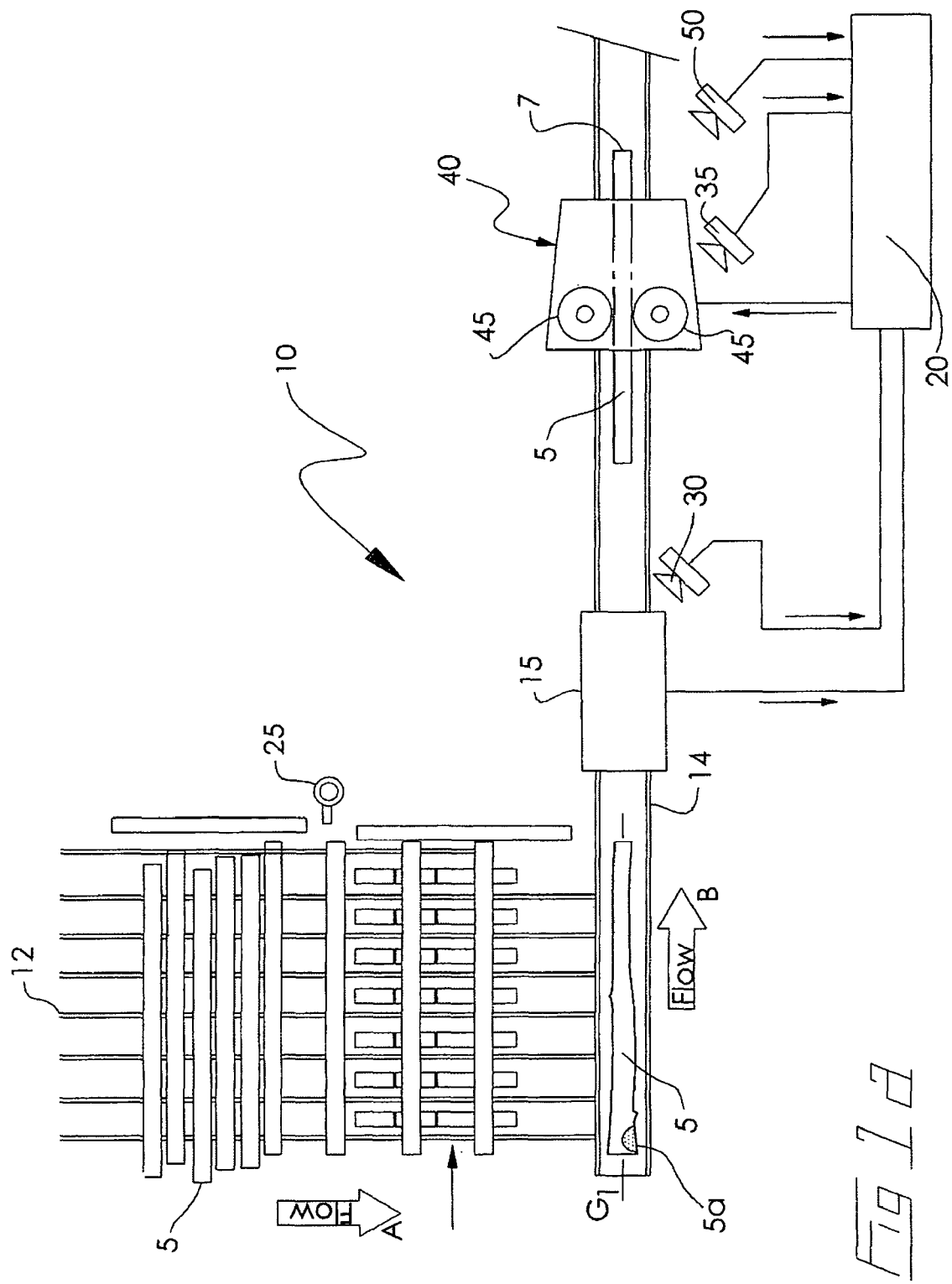

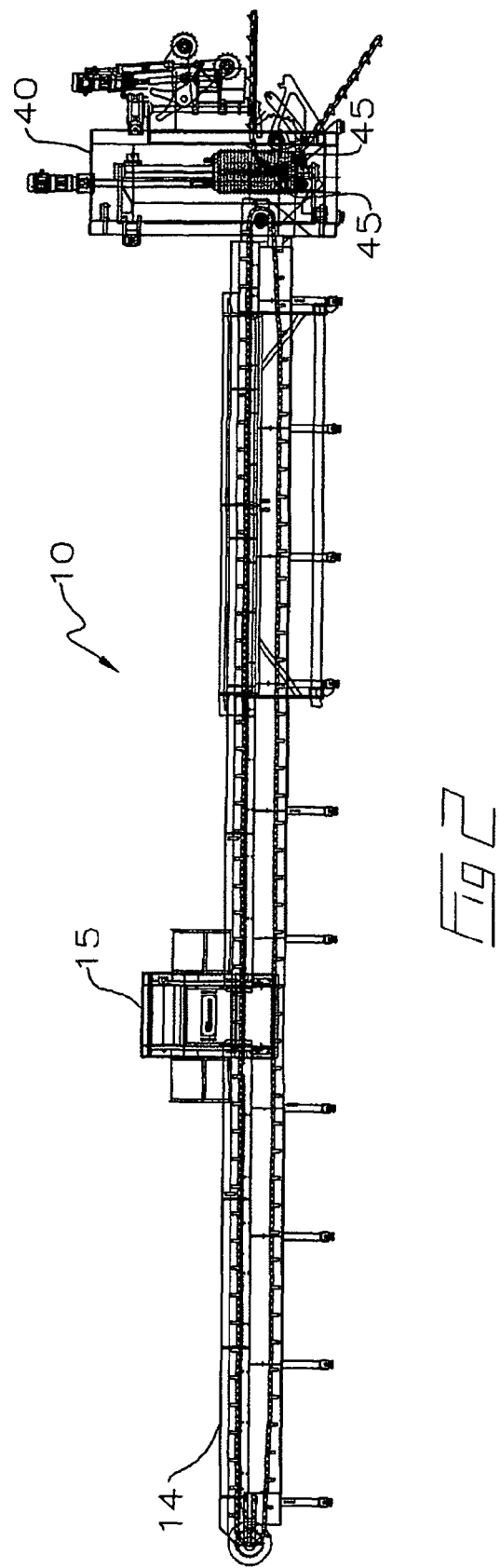

SYSTEM FOR POSITIONING A WORKPIECE

CROSS REFERENCE TO RELATED APPLICATION

This application claims priority from U.S. Provisional Patent Application No. 60/608,101 filed Sep. 9, 2004 entitled System for Positioning a Workpiece.

FIELD OF THE INVENTION

This invention relates to the field of devices for positioning a workpiece in a sawmill, and more particularly, it relates to a system for positioning a workpiece into an optimized position to produce the highest value or yield of lumber.

BACKGROUND OF THE INVENTION

Conventional log turners known as "flying log turners", typically comprise a pair of four to five foot long vertically oriented spiked rolls which are located on each side of a transporting conveyor. The log turner rotates a workpiece, such as a log, as the workpiece travels towards the infeed of a primary breakdown machine, such as canters, bandmills or circular Scragg saws. The spiked rolls of the log turner are movable laterally towards and away from the centreline of a workpiece, longitudinally along the length of the workpiece in an open-and-close operation, and vertically upwards and downwards to engage, manipulate, and rotate the workpiece. The pair of rolls moves in an open-and-close operation to control the location along the length of the log where the rolls contact and manipulate the log position. Each roll, or set of rolls also moves in the vertical direction.

Other conventional log turners known as knuckle turners provide a less accurate method of turning logs. If accurate turning feedback was achieved, this would be a more cost-effective method of turning the logs as compared to flying log turners.

As a workpiece travels along the conveyor en route to the primary breakdown machines, an optimizer, using data from a scanner, determines an optimized position of the workpiece such that the workpiece, when processed in accordance with the desired angular rotation of the optimized position, may generate the highest value or yield of lumber. To position the workpiece in the optimized position, motion control data generated by the optimizer and associated programmable logic controller (PLC) initiates movement of the log turner to rotate the workpiece in order to attain the optimized position. In flying log turners lateral and longitudinal displacement of the spiked turning rolls brings the rolls into contact with the surface of the workpiece. The vertical displacement of each spiked roll allows the workpiece to be rotated about its longitudinal axis. The log turner rotates the workpiece until the optimized position is achieved.

During the turning process, surface irregularities such as protruding knots or indentations on the surface of the workpiece may affect proper contact of the spiked rolls with the workpiece, thereby inhibiting proper rotation of the workpiece to position it in the optimized position. This turning inaccuracy results in a significant reduction in lumber recovery. Furthermore, even if the optimized position is achieved, movement of the transport conveyor on which the workpiece travels may not maintain the workpiece in the optimized position. Precision in workpiece rotation and workpiece positioning is made even more difficult given the high speed at which the log turner performs its function. By providing a system to improve the accuracy of workpiece positioning, lumber volume and value will thereby increase.

The scanner/optimizer decides what angular orientation the log needs to be in to get the highest value breakdown solution from the log. Motion control data is sent from the Optimizer to the PLC control system allowing the rolls to contact the log, and by moving the rolls in opposite vertical directions; the log can be rotated to the desired angular position.

During the log turning process, approximately eight feet along the length of the log is in contact with the turning rolls. Because the outer surface of the log typically exhibits many geometric defects such as knots, cat-face, etc., smooth & consistent contact with the turning rolls is impeded. This in turn results in the target angular position of the log not being reached. For example, as the rolls pass over a knot that is sticking out, optimal contact with the log is sacrificed and therefore the targeted position is not achieved. Depending on log geometry, log diameter and products being manufactured, this turning inaccuracy can have a significant impact on lumber recovery.

SUMMARY OF THE INVENTION

It is an object of the present invention to provide a system of positioning a workpiece into an optimized position whereby rotational accuracy of a workpiece may be monitored, maintained, and/or corrected so that positional or rotational errors at primary breakdown may be avoided, thereby improving overall lumber recovery.

It is another object of the present invention to provide a marking device to place a mark on an end of the workpiece to assist the system in monitoring, maintaining, and/or correcting the position of the workpiece such that the optimized position may be achieved and maintained.

It is another object of the present invention to provide a means for identifying the orientation of the mark in real-time as the workpiece is transported through the turning mechanism such that any necessary corrective angular repositioning may be timely performed to ensure that the orientation of the mark prior to the workpiece leaving the turning mechanism coincides with the optimized position of the workpiece.

It is another object of the present invention to provide a evaluator to determine in real-time if there are any positional differences between the orientation of the mark and the optimized position while the workpiece is being rotated and transported towards the primary breakdown machine.

It is a further object of this invention to provide a mechanism for transmitting corrective positioning information to control the operation of the turning mechanism to adjust the position of the workpiece such that the optimized position may be achieved and maintained.

The present invention is a system for positioning a workpiece into an optimized position. The system includes a marking device adapted to place a mark on the workpiece prior to the workpiece passing through an optimizer. A first identifying means identifies the orientation of the mark as a point of reference such that the workpiece may be positioned into the workpiece's optimized position by rotating the workpiece relative to the orientation of the mark. A turning mechanism rotates the workpiece. A second identifying means identifies the orientation of the mark while the workpiece is being rotated. An optimizer or other processor receives information from the first identifying means and from the second identifying means to determine if the workpiece is in the optimized position. A PLC or other processor controls rotation of the workpiece such that the optimized position of the workpiece may be achieved.

The marking device may be a spray paint marking device for placing a spray paint line on an end of the workpiece. A first camera identifies the orientation of the mark. This may be prior to the workpiece exiting the optimizer. The optimizer determines the optimized position of the workpiece. A workpiece turning mechanism such as one including a pair of turning rolls, one turning roll on each side of a conveyor, rotates the workpiece to its optimized position. The turning rolls may be spiked to grasp the workpiece without slipping. The turning rolls may also displace horizontally to engage the workpiece. They may also rotate about a vertical axis to assist in transporting the workpiece along the conveyor. The pair of turning rolls displace vertically relative to one another, upwards and downwards, causing the workpiece to rotate where sandwiched between the rolls. A second camera maybe positioned within the turning mechanism. A third camera may be positioned adjacent to the turning mechanism. The second and third cameras identify the orientation of the mark in real-time, continually or at predetermined time intervals while the workpiece is being rotated. The real time orientation of the mark is transmitted to the processor which compares the real time orientation of the mark with the desired optimized position of the workpiece to determine if the workpiece is in the optimized position. To position or maintain the workpiece in the optimized position, the processor transmits information to the turning mechanism to control rotation of the workpiece such that the optimized position of the workpiece may be achieved and maintained.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is a detailed plan view of the infeed, scanner/optimizer, conveyor and turning roll portions of the present invention;

FIG. 1a is a schematic plan view of the present invention;

FIG. 2 is a detailed side elevational view of the invention illustrated in FIG. 1;

DETAILED DESCRIPTION OF EMBODIMENTS OF THE INVENTION

Figure 3:
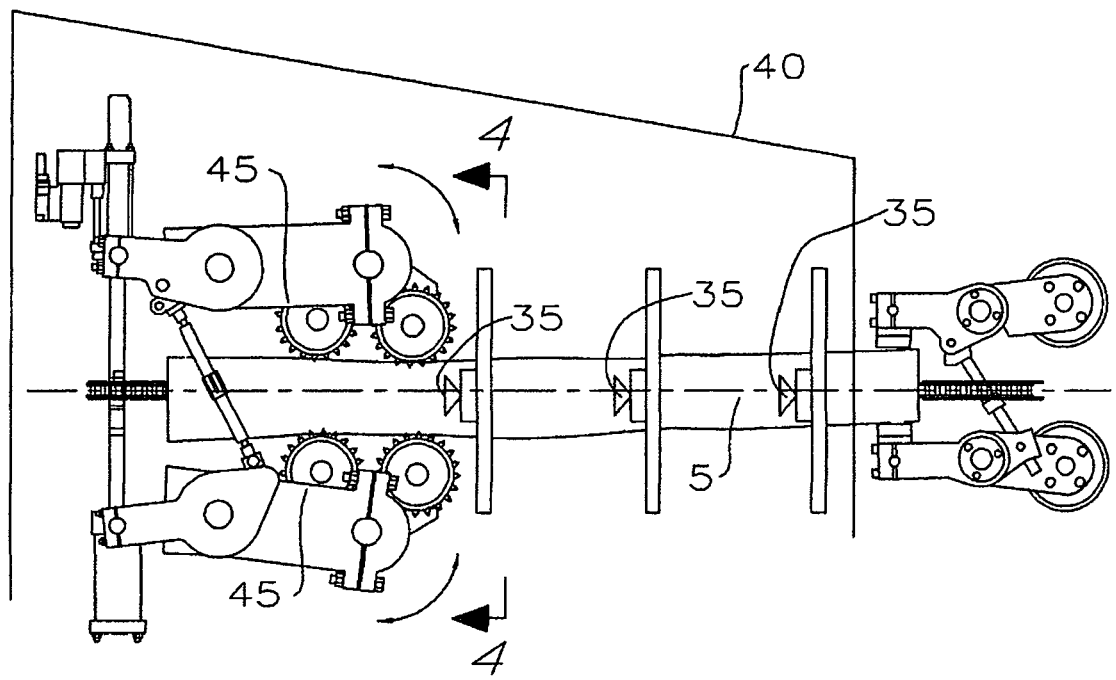
FIG. 3 is an enlarged plan view of a portion of the turning roll mechanism.

With reference to the Figures wherein similar characters of reference denote corresponding parts in each view, a system 10 according to the present invention includes a scanner/optimizer 15, a processor 20, a marking device 25, a first and a second mark orientation identifying means 30 and 35, and a turning mechanism 40.

As seen in FIGS. 1 and 1a, a plurality of logs, referred to herein alternatively as workpieces 5, located on an infeed 12 are transported by suitable means, such as a chainway or other conveyor, in downstream direction of flow A on a feedpath towards a conveyor 14. Marking device 25 mounted along infeed 12 makes or places a mark 28 on each workpiece 5. Alternatively, marking device 25 may be positionable along conveyor 14 so that marking device 25 places mark 28 on workpiece 5 prior to workpiece 5 passing through scanner/optimizer 15. In one embodiment, not intended to be limiting, marking device 25 is a spray paint marking device for placing a visually observable spray paint line on an end 7 of workpiece 5. Alternatively, marking device 25 may be a cutting means for making a superficial visual cut mark on end 7 of workpiece 5. It will be recognized that there are many different marks and marking devices within the scope of the present invention that may be used to provide a suitable mark on workpiece 5 as a reference point to provide information regarding the rotational position of workpiece 5. Further, as better described below, natural features or objects or irregular shapes occurring on or along the workpiece may serve as a mark for the purposes of tracking the rotational orientation of the workpiece.

Workpieces 5, which are marked on ends 7, are then transported on conveyor 14 in downstream direction B towards and through scanner/optimizer 15. Scanner/optimizer 15 detects, analyzes, and classifies the geometrical information and surface characteristics or features of each workpiece 5 and determines an optimized cutting solution to obtain optimal lumber production from each workpiece 5. Based on the optimized cutting solution, scanner/optimizer 15 calculates an optimized position for each workpiece 5 such that workpiece 5 may be rotated into its position prior to processing in a downstream machine center such as a canter, gangsaw, etc. The optimizer may determine the optimized position of workpiece 5 simultaneously with first identifying means 30 identifying the orientation of mark 28 on end 7 of workpiece 5. In one embodiment, first identifying means 30 is a first vision camera such as a video camera mounted adjacent to and in proximity with scanner/optimizer 15 such that end 7 of workpiece 5 may be photographed or scanned prior to end 7 passing through scanner/optimizer 15. Data relating to the orientation of mark 28 identified by first identifying means 30 is then transmitted to processor 20. The optimized position calculated by scanner/optimizer 15 is also transmitted to processor 20. Typically, processor 20 is a computer or a PLC system capable of controlling turning mechanism 40 to rotate and position workpiece 5 into its optimized position. The orientation and position of mark 28 identified by first identifying means 30 serves as a reference point to assist processor 20 in controlling the rotation of turning mechanism 40 to position workpiece 5 in the optimized position, as described below.

Figure 4:
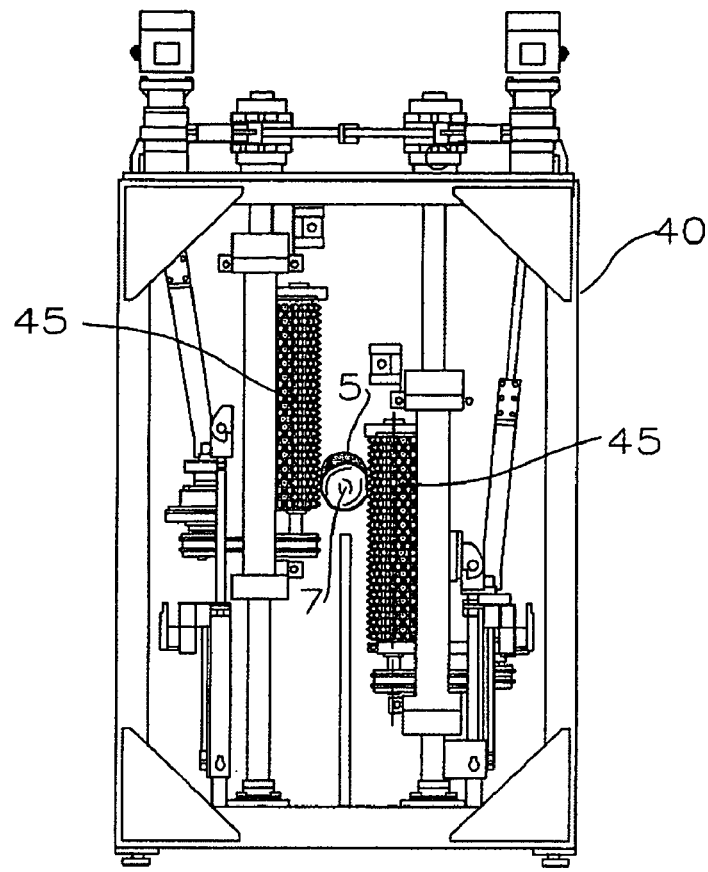
FIG. 4 is a sectional view taken on line 4-4 of FIG. 3.
Figure 5:
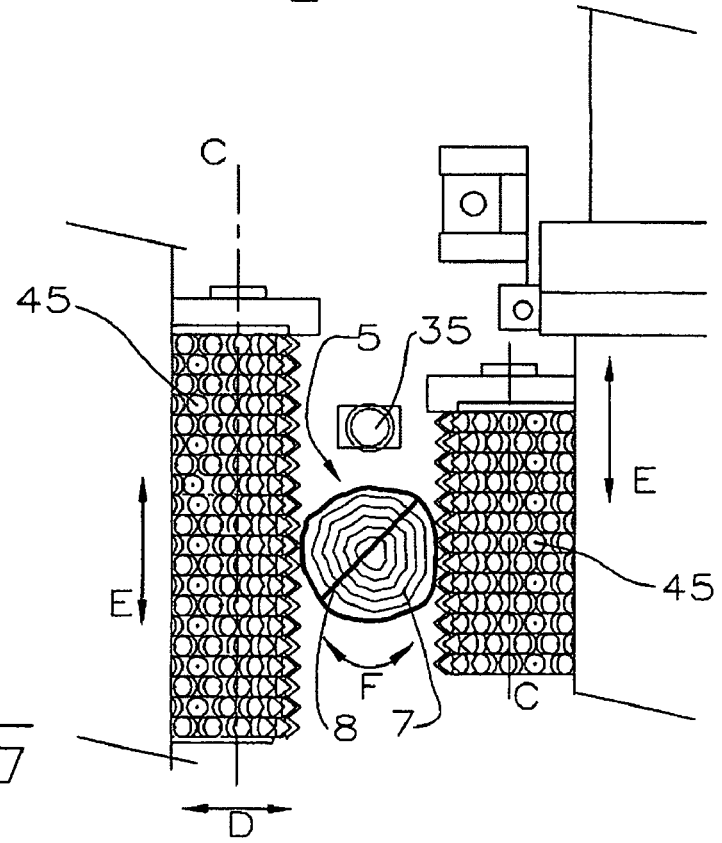
FIG. 5 is an enlarged view of a portion of FIG. 3.

As seen in FIGS. 3 to 5, turning mechanism 40 comprises a plurality of turning rolls 45 located on each side of conveyor 14. Turning rolls 45 are typically spiked to enable turning rolls 45 to engage the surface of workpiece 5 to rotate workpiece 5. As seen in FIG. 3, only two pairs of turning rolls 45, one pair on each side of conveyor 14, are illustrated and is not intended to be limiting as two turning rolls 45, one on each side of conveyor 14, or four or more even numbered pairs of turning rolls 45 may be employed. Each pair of turning rolls 45 may simultaneously rotate about their vertical axis C and/or displace in direction D laterally of the direction of flow B, towards and away from the centreline of workpiece 5. Rotation of turning rolls 45 about vertical axis C assists with the transport of workpiece 5 along conveyor 14. Lateral displacement of turning rolls 45 in direction B allows turning rolls 45 to engage the surface of workpiece 5 of varying widths. To rotate workpiece 5, turning rolls 45 may also independently displace vertically upwards and downwards in direction E along their corresponding vertical axes C, to thereby rotate workpiece 22 in a clockwise or counter-clockwise direction about its longitudinal axis G, as shown by arrow F. Turning rolls 45 are actuated by conventional actuator means such as hydraulic means while the rotational, lateral, and vertical movement of turning rolls 45 are controlled by processor 20. Processor 20 transmits information by conventional means to turning mechanism 40 to control actuation of rolls 45 so as to selectively rotate and position workpiece 5 into the optimized position.

Second identifying means 35 monitors the position of mark 28 as workpiece 5 is rotated by turning mechanism 40. Second identifying means 35 may include a second vision camera such as a video camera, wherein the second camera may be mounted within turning mechanism 40. In another embodiment, at least two second identifying means 35 are mounted within turning mechanism 40, as seen in FIG. 3. A third identifying means 50, in a preferred embodiment including a third vision camera, is positioned along conveyor 14 where workpiece 5 exits turning mechanism 40. For simplicity, and not intending to be limiting, only a single second identifying means 35 and a single third identifying means 50 are illustrated in FIG. 1a.

Second and third identifying means 35 and 50 identify the orientation of mark 28 continually or at predetermined length or time intervals, such as every 5 seconds, and transmits the orientation information for the mark such as mark 28 to processor 20. Processor 20 performs an evaluation in real time of any positional differences between the desired optimized position of workpiece 5 and the real time position of workpiece 5, as indicated by reference to the orientation of the mark such as mark 28. If the orientation of the mark indicates that workpiece 5 is not in the optimized position, processor 20 calculates the required angular rotation of workpiece 5 so as to position workpiece 5 into the optimized position and transmits such corrective information to turning mechanism 40. Any positional errors of workpiece 5 are thus corrected on a continual basis until workpiece 5 exits turning mechanism 40. If the orientation of mark 28 indicates workpiece 5 is in the optimized position, processor 20 and turning mechanism 40 cooperates to maintain workpiece 5 in the optimized position by making any necessary adjustments if workpiece 5 is displaced, for example, by the movement of conveyor 14.

Video images may be used to track the movement of the log or workpiece by identification of an object or other feature such as a patch of bark 5a in the image and tracking the relative movement of that object or feature or unique characteristic of the log, frame to frame. This may also be accomplished using mathematical techniques such as correlation or phase correlation, or object tracking techniques known in the art. To obtain a correct movement a range measurement must be added to determine if translation is occurring. This range measurement can also provide log diameter for side to side translation and geometric correction to the video image. If video information is taken in several locations the log can be tracked very accurately and the log can be rotated to the correct optimized location for log breakdown in the downstream machine center. The tools can also be adjusted to correct for translations that the log has made during rotation and transportation process before the machine center.

The same can be done using the three-dimensional shape of the log. The original log is scanned using a three-dimensional scanning system and that data correlated with the original three-dimensional shape data to determine rotation and location.

These are just examples and many methods may be used to measure the log rotation and provide feedback to allow for precise rotation and correct tool placement of the machine center.

The system would then, in real time, calculate and communicate corrective positioning information to the motion control system that is controlling the log turners, so any potential angular orientation error could be corrected on a continuous basis during the log turn process. If tracked further in the process, exact location of the log may be determined and the cutting tools adjusted accordingly.

In interpreting both this specification and the claims that follow, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. The term "mark" is meant to include orientation marks added to a log, and to other inherent orientation objects and features including unique or non-symmetrical log shape which may be tracked to determine if a rotational orientation of a log has changed or if a preferred or optimized rotational orientation of a log has been obtained.

In this fashion, rotation position and location errors are reduced to thereby improve overall lumber value recovery. Placing a reference mark on the log prior to the turner rolls is described above. This may be in the form of a vertical line painted on the end of the log somewhere on the log infeed. A camera reads the orientation of the paint mark at frequent intervals during the turn process. The sub-system that looks at the vertical paint spray mark calculates an angular orientation and communicates this to the optimization system at predetermined intervals (every 6" to 12", for example along the log). The same error rotation correction could be accomplished using log image or shape recognition. Other methods would also work.

As will be apparent to those skilled in the art in the light of the foregoing disclosure, many alterations and modifications are possible in the practice of this invention without departing from the spirit or scope thereof accordingly, the scope of the invention is to be construed in accordance with the substance defined by the following claims.

What is claimed is:

1. A system for rotationally positioning a workpiece which is translating downstream along a feedpath, comprising:
   a processor;
   an optimizing scanner, operatively coupled to the processor, configured to scan the workpiece and calculate an optimized position for the workpiece;
   a first detector, operatively coupled to the processor, configured to detect a rotational orientation of the workpiece about the longitudinal axis of the workpiece;
   a turning mechanism, operatively coupled to the processor, located downstream of the first detector and configured to selectively rotate the workpiece about the longitudinal axis of the workpiece; and
   a second detector, operatively coupled to the processor, located downstream of the first detector and positioned proximal to the turning mechanism to detect the rotational orientation of the workpiece while the workpiece is being rotated downstream of the first detector by the turning mechanism,
   wherein the processor is configured to receive information from the optimizing scanner, the first detector, and the second detector and to determine if the workpiece is in the optimized position, and
   wherein the processor is further configured to control rotation of the workpiece by the turning mechanism until the workpiece is in the optimized rotational position.

2. The system of claim 1 further comprising a workpiece marker, operatively coupled to the feedpath, located upstream of the first detector and configured to mark the workpiece with an orientation mark.

3. The system of claim 2 wherein the workpiece marker comprises a spray paint marking device configured to place a visual spray paint line on an end of the workpiece.

4. The system of claim 1 wherein the first detector comprises a camera configured to detect the rotational orientation of the workpiece prior to the workpiece exiting the optimizing scanner.

5. The system of claim 1 wherein the turning mechanism comprises at least two pairs of turning rolls, at least one pair of the pairs of turning rolls positioned on each side of a conveyor that is disposed along the feedpath, the pairs of turning rolls configured to engage and rotate the workpiece whereby contact of the pairs of turning rolls with uneven surfaces of the workpiece is maintained despite abrupt surface irregularities disturbing contact of one turning roll of the pairs of turning rolls from the surface of the workpiece.

6. The system of claim 1 wherein the first detector is a component of the optimizing scanner.

7. The system of claim 5 wherein the turning rolls displace horizontally towards and away from the workpiece to engage the workpiece, and the turning rolls further rotate about a vertical axis to assist in transporting the workpiece along the conveyor.

8. The system of claim 7 wherein the turning rolls displace vertically upwards and downwards along the vertical axis to rotate the workpiece.

9. The system of claim 2 further comprising a third detector, operatively coupled to the processor, configured to detect the orientation of the orientation mark on the workpiece while the workpiece is being rotated in the turning mechanism.

10. The system of claim 9 wherein the second and third detectors are cameras, and wherein the second detector is disposed adjacent to the turning mechanism and the third detector is disposed downstream of the second detector such that the orientation of the orientation mark on the workpiece may be detected prior to the workpiece exiting the turning mechanism, and wherein the second and third detectors are in communication with the processor.

11. The system of claim 10 wherein the second and third detectors are configured to detect the orientation of the orientation mark on the workpiece at predetermined intervals and transmit information about the detected orientation to the processor for processing in real time.

12. The system of claim 11 wherein the processor compares in real time the orientation of the orientation mark on the workpiece with the optimized position of the workpiece to determine if the workpiece requires further rotation prior to exiting the turning mechanism whereby the workpiece is maintained in the optimized position.

13. The system of claim 12 wherein the processor transmits information to the turning mechanism to control rotation of the workpiece such that the optimized position of the workpiece is achieved and maintained.

14. The system of claim 1 wherein the first and second detectors are vision cameras.

15. The system of claim 14 wherein the information from the first and second detectors comprises video images of a feature of the workpiece.

16. The system of claim 14 wherein the information from the first and second detectors comprises video images of an object on the workpiece.

17. The system of claim 14 wherein the information from the first and second detectors comprises video images of a three-dimensional shape of the workpiece.

18. The system of claim 14 wherein the processor includes means for correlating at least one feature of the workpiece in the information from the first and second detectors so as to track rotational orientation of the workpiece about said longitudinal axis.

19. The system of claim 14 wherein the processor includes means for tracking at least one object on the workpiece in the information from the first and second detectors so as to track rotational orientation of the workpiece about said longitudinal axis.

20. The system of claim 1 wherein the first detector is a component of the optimizing scanner and wherein the second detector is a vision camera, and wherein the processor includes means for tracking changes in rotational orientation of the workpiece about said longitudinal axis by correlating information, the information including three-dimensional image information of the scanned workpiece.

21. A rotational positioning system for a workpiece, comprising:
   a first detector configured to detect an identification feature of the workpiece;
   a processor coupled to the first detector and configured to determine an amount of workpiece rotation required to position the workpiece for cutting in accordance with an optimized cutting solution;
   a workpiece turner coupled to the processor and configured to turn the workpiece along a longitudinal axis based on a rotation input from the processor;
   a second detector located downstream of the first detector, the second detector coupled to the processor and configured to detect the amount of workpiece rotation achieved by the workpiece turner.

22. The rotational positioning system of claim 21, wherein the second detector is further configured to continuously monitor the rotation of the workpiece and to convey rotation position data to the processor.

23. The rotational positioning system of claim 22, wherein the processor is further configured to cause the turner to make additional turns to the workpiece based on the rotational position data conveyed by the second detector.

24. The system of claim 21 wherein the processor is configured to correlate data relating to the identification feature of the workpiece from the first detector and data relating to the identification feature of the second detector to track rotational orientation of the workpiece about the longitudinal axis of the workpiece.

25. The rotational positioning system of claim 21, wherein the identification feature is one or more of a geometry of the workpiece, a natural marking on the workpiece or an applied marking on the workpiece.

* * * * *

UNITED STATES PATENT AND TRADEMARK OFFICE
CERTIFICATE OF CORRECTION

PATENT NO.        : 7,857,021 B2                                             Page 1 of 1
APPLICATION NO.   : 11/221928
DATED             : December 28, 2010
INVENTOR(S)       : Murray Boyd et al.

It is certified that error appears in the above-identified patent and that said Letters Patent is hereby corrected as shown below:

In the claims,

Column 8, line 50, "The system of claim 21 ..." should read --The rotational positioning system of claim 21 ...--.

Signed and Sealed this
Twelfth Day of January, 2016

Michelle K. Lee
*Director of the United States Patent and Trademark Office*